April 7, 1959
V. J. WIBBENS
2,880,467
METHOD OF MAKING REINFORCED FOOTWEAR
Filed Jan. 4, 1954
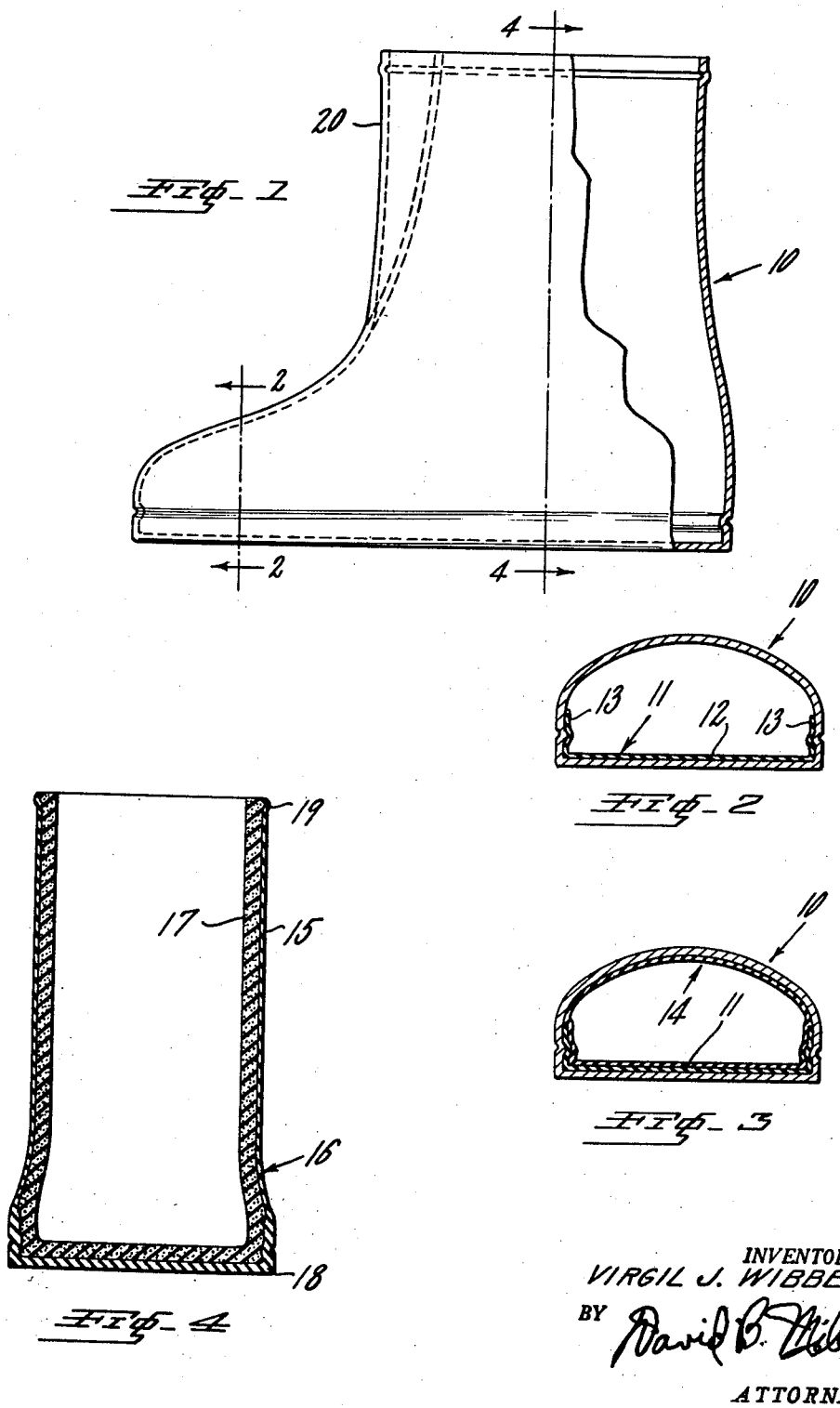
INVENTOR.
VIRGIL J. WIBBENS
BY
ATTORNEY

United States Patent Office 2,880,467
Patented Apr. 7, 1959

2,880,467

METHOD OF MAKING REINFORCED FOOTWEAR

Virgil J. Wibbens, South Bend, Ind., assignor to United States Rubber Company, New York, N.Y., a corporation of New Jersey Application January 4, 1954, Serial No. 401,956

2 Claims. (Cl. 18—58)

This invention relates to a method of making slush molded reinforced plastic footwear.

Rubber-like footwear such as plastic gaiters have been produced heretofore by the so-called "slush molding" method. In carrying out this method, a hollow metal mold is used which is heated either before or after the plastic molding material is introduced thereinto. The hollow mold is filled completely or to the desired height with a creamy plastic material that is to produce the finished article, and the heat applied to the metal mold causes a layer of the plastic material that contacts the mold walls to deposit on these walls and adhere thereto. As soon as a deposit layer of the desired thickness has formed on the inner walls of the mold, the rest of the creamy plastic material is poured from the mold, whereupon the mold is heated further to fuse the layer into a tough flexible rubbery article that has accurately imparted thereto the contours of the interior of the mold.

This molded article of footwear, because of its tough elastic properties, can be easily stripped from the mold as a finished article of manufacture, and due to its tough flexible properties it is not readily marred as it is removed from the mold or when it is used. The plastic material used to produce such slush molded footwear is preferably a vinyl plastisol, prepared by dispersing finely divided polyvinyl resin powder in a liquid plasticizer therefore to form a creamy liquid. The preparation of plastisols and their use are well known by those skilled in the art, and are described in more detail in Modern Plastics 26, 78 (April, 1949) by Perrone and Neuwirth.

This slush molding procedure as will be apparent from the foregoing is easy and inexpensive to practice, and produces seamless footwear that conform accurately to the contours of the mold. Articles of footwear when made by such slush molding procedures are waterproof and inexpensive, and they are highly satisfactory when worn. However, because of the nature of footwear and the use to which footwear is put, it is found frequently that the sole area of the footwear will wear out long before the upper has completed its useful life. Of course these articles can be made having soles of various thicknesses, but if the article is made of such a thickness that the sole will give satisfactory wear, there is much wastage of the materials from which these articles of footwear are made in the footwear upper where this additional thickness is neither needed nor desired.

It is the primary object of this invention to provide a method of making a slush molded reinforced article. More specifically, this invention contemplates an article of footwear that is formed by a slush molding technique, wherein the sole area of the footwear is reinforced to provided a wear resistant wall in the sole area that is thicker than the footwear upper.

An article of footwear having this reinforced sole portion can be produced in accordance with this invention by employing a heated hollow metal mold and slush molding therein a creamy resinous material, as above described, to deposit on the inner walls of the mold a reinforcing wall for the sole area. In accordance with this invention the hollow metal mold is filled with creamy resinous material to a depth sufficient to cover the sole thereof, and if desired the mold may be filled to a depth, in the order of one-half inch, sufficient to form a reinforced area which extends upwardly from the sole a short distance. The metal mold may have been heated previously, or it may then be heated to cause a thin layer of the resinous material to deposit on the walls of the mold in the sole area. The thickness of this deposit will increase with each second the creamy liquid remains in the hot mold. Thereafter, further creamy resinous material may be poured into the mold until the mold is filled to the height necessary to produce the finished article of footwear. The resinous material in the mold is subjected to further heat to deposit a thin layer on the remainder of the walls of the mold, and to deposit a further layer on the interior of the first formed layer. Thereafter, excess creamy resinous material is poured from the mold, and the mold is subjected to further heat to fuse the resin in the layers deposited on the inner walls of the molds. Upon fusion of these layers, the several layers in the sole area will be fused into an integral mass, and the footwear when stripped from the mold will have a relatively thin upper, and a relatively thick reinforced sole area as is desired in articles of this type.

To produce a reinforced article of footwear by this method wherein the footwear is provided with a thermally insulating lining, the mold after the excess creamy resinous material has been poured therefrom is heated sufficiently to gel, but not to fuse, the thin layers deposited on its interior walls. Thereafter it may be refilled with a more or less similar plastic resinous material but which contains a blowing agent. The resinous material in the mold is subjected to sufficient heat from the mold to cause a deposit of a layer of this material containing the blowing agent to be formed on the interior of the other layers deposited on the walls of the mold, but care is taken to maintain the temperature below the blowing temperature of the blowing agent. After this layer containing the blowing agent has been deposited on the walls of the mold, excess liquid may be poured from the mold. Thereafter, the metal mold is heated to blow the layer containing the blowing agent, and to fuse the resin in the several layers so that these layers are fused into a unitary article of footwear having a cellular lining interior thereof. Thereafter, the insulated reinforced footwear may be removed as the finished article of footwear.

"Fusion" takes place when the temperature is raised above the softening point of the resin, at which temperature the solvent action of the plasticizer is increased to cause the resin and plasticizer to form a tough homogeneous resinous mass in which the powdered resin and the liquid plasticizer have coalesced to form a single phase. The terms, "fused" and "fusion," as used herein, denote heat treatment to produce this result. The fusion, which takes place during the final heating step, is absolutely essential to transform the gelled film or layer, which is very weak and cheesy, into a tough leather-like homogeneous film. When the insulated footwear is being produced, a six minute application of heat at 420° F. is found about right to effect fusion and blowing, although the temperature will vary with the resinous composition and the particular blowing agent employed. Generally a temperature above 200° F. is required.

The above and other features of the instant invention will be further understood from the following description when read in conjunction with the accompanying drawing, wherein:

Fig. 1 is a side elevational view partly broken away of a hollow metal mold that may be used in slush molding a rubber like flexible footwear in accordance with this invention;

Fig. 2 is a cross sectional view of the mold of Fig. 1 taken substantially along the line 2—2 showing a reinforcing layer deposited on the walls thereof;

Fig. 3 is a view similar to Fig. 2 showing the shell of the footwear deposited on the walls of the mold wherein this shell is reinforced in the sole area; and Fig. 4 is a cross sectional view through a reinforced thermally insulated article of footwear in accordance with this invention that would be produced in the mold shown in Fig. 1; the view shown in Fig. 4 is of that portion of the footwear which would be seen along a line corresponding to 4—4 of Fig. 1.

The metal mold employed to carry out the present invention may be electroformed or otherwise made, but excellent results are secured by employing a sprayed metal mold produced by spraying hot molten aluminum onto a mold having the exact contour it is desired to impart to the finished slush molded article. The sprayed aluminum mold such as indicated by 10 in the drawings is preferably produced by having a designer make of wood or plastic a model having the size and contour to be imparted to the finished article of footwear. Then this artistic model is used to mold about the same a flexible shell, made from a low temperature setting elastomeric molding compound. This flexible shell is used as a female mold to produce any number of plaster molds upon which the metal is sprayed. The solid plaster mold (not shown) is sprayed with nylon to give it a smooth nylon surface ready for use in producing the sprayed metal mold such as indicated by 10. This metal mold is formed by spraying onto the nylon covered solid mold, an aluminum composition in a molten condition to build up the desired wall thickness around the nylon covered mold. Such solid plaster mold is then destroyed and removed from the hollow metal mold, which now has the appearance shown in Fig. 1 of the drawing and is ready for use in slush molding hollow plastic articles.

In carrying out the method of this invention, sufficient creamy resinous material is poured into the mold 10 to cover the sole area thereof. Preferably sufficient creamy resinous material is poured into the mold to fill the same to a depth somewhat greater than that necessary to just cover the sole of the footwear, for example to a depth of about one-half inch. When creamy resinous material is poured into the mold to such a depth, heating of the mold will cause a layer 11 of resinous material, which has a shell-like configuration, to be deposited on the walls of the mold. As shown in Fig. 2, where for clarity of illustration the creamy resinous material that would normally fill the shell 11 has not been shown, this shell-like layer 11 will have a sole area 12 from which upstands the walls 13 a little distance above the plane of the sole. As shown, the walls 13 are deposited on the sidewall portions of the mold in the foxing area thereof.

If desired the mold 10 may have been heated before the creamy resinous material to form the layer 11 is poured into the mold, but preferably the mold is heated after this creamy resinous material is poured thereinto. Although the temperature to which the mold is heated and the time during which the mold is subjected to this temperature may be varied as will be obvious to those skilled in this art, a pass of about 8 minutes' duration through an oven at a temperature of about 200° F. is found to deposit a satisfactory reinforcing layer 11 on the interior of the mold. After the reinforcing layer 11 has thus been deposited on the walls of the mold 10, additional creamy resinous material is poured into the mold to substantially fill the same to a point slightly higher than the top of the desired footwear. After this material in the mold has been in contact with the hot metal walls for a few seconds, the mold 10 is emptied, as by upending it, to pour out all of the creamy resinous material that does not adhere as a weak skin to the metal walls of the mold. At this point the walls of the mold will be lined with a thin layer 14 of resinous material which will form the walls 15 as best shown in Fig. 4. As shown in Fig. 3, this layer 14 is formed within the shell 11 so that the resinous material deposited on the walls of the mold 10 have a thickness in the sole area and for a little distance upwardly therefrom which is greater than the thickness of the layer 14 forming the remainder of the walls by an amount substantially equal to the thickness of the layer 11. At this point, the resinous material in the layers 11 and 14 may be fused into a tough leathery skin, and the layers 11, 14 fused into a unitary mass to produce an article of footwear having its sole area reinforced as illustrated in Fig. 3.

However, in one preferred embodiment of this invention, the footwear is formed having a heat insulating cellular resinous lining interiorly thereof. To produce an insulated reinforced article of footwear, the mold having the skins 11, 14 therein is subjected to sufficient heat to gel these layers to a dry slightly tacky condition, but the heat and time of application of the same should not be sufficient to completely fuse these resinous layers that are to form the outer wall 16 of the finished footwear. It has been found that to gel the deposited creamy resinous material to a solid without fusing it requires about 90 seconds in an oven at 420° F. The term "gelling" as herein used means that transition which takes place upon heating to convert the deposited heavy viscous plastisol liquid to a very cheesy solid, but not to the stage in which the plastisol particles are fused to a tough homogeneous translucent sheet.

To provide this article of footwear with a cellular resinous lining having good thermal insulating properties, the slush molding procedure is repeated substantially as described above for the deposition of the layer 14, in that the hot metal mold 10 having deposited on its inner walls the gelled resinous layers 11, 14 is now filled with a creamy resinous material which contains a blowing agent. After the hot metal mold having its inner walls covered with the layers 11, 14 has been filled with this resinous material containing a blowing agent to deposit therein a further creamy layer containing a blowing agent, the mold is again promptly emptied.

The metal mold 10 now having deposited therein the resinous layers 11, 14 and the resinous layer containing the blowing agent, is heated to above 350° F., preferably 420° F. for a sufficient length of time, say 5 to 10 minutes, to blow the resinous layer containing the blowing agent to thereby produce a cellular lining having good thermal insulating properties. This application of heat should be continued until the layers 11, 14 and the layer containing the blowing agent are fused to a tough, durable rubber-like or leathery condition and the several layers are integrally bonded together. It will be understood that the temperature required to fuse the resinous material will vary with the amount of plasticizer and the particular resin used in the resinous composition. The decomposition temperature of the blowing agent should match, as closely as possible, the fusion temperature of the resinous material. If the blowing agent decomposes before fusion begins, the film is not firm enough to contain the gas. In the gel state the film permits the gas to permeate through to the surface.

After the several layers have been fused as just mentioned, and the metal mold 10 has been cooled to some extent, preferably below the softening point of the resinous material, the plastic footwear produced therein is stripped from the mold, whereupon it will appear substantially as shown in Fig. 4 and having the internal cellular thermally insulating lining 17 and the reinforced sole area 18, but having the relatively thinner sidewalls 15. Such article of footwear is seamless throughout and preferably has a smooth, tough, durable outer surface that presents in reverse the contour of the smooth finish of the inner walls of the metal mold 10. This article of footwear is preferably trimmed at its upper end above the bead 19 so as to give it a smoth upper edge. When a mold having wings such as that shown at 20 is used, the footwear will be provided with an expansible pocket to permit the insertion of the foot thereinto.

The materials used to form the layers 11, 14 and the insulating layers 17 is preferably what is known as a plastisol or vinyl plastisol which has been carefully formulated to impart to the same a viscosity such that it will take accurately the contour of the mold cavity and will produce the resinous walls of the desired thickness under the used mold temperature, and will also have the desired stiffness, tear resisting strength, durability, color, etc. The finished article is tough and durable and may be made in various colors, and the thickness of the layers 11, 14 and 17 can be varied by varying the heat treatment and the viscosity of the plastisol, and the amount of blowing agent.

A satisfactory formulation for the layers 11, 14 is a plastisol such as follows:

| Ingredient: | Parts by weight |
|---|---|
| "Plastisol grade" polyvinyl chloride (Geon #121 or QYNV mfd. by B. F. Goodrich and carbide and carbon respectively) | 100 |
| Plasticizer: | |
| Dioctyl phthalate | 41 |
| Dioctyl adipate | 15 |
| Polyester resin plasticizer (of the type disclosed in Ind. Eng. Chem. 37, 504 (1945) e.g., "Paraplex G–60") | 14 |
| Stabilizer (organic cadminum compound) | 3 |
| Coloring pigment | 1 |

The plasticizer, stabilizer and coloring pigment are preferably mixed together in a suitable container, then the resin is added slowly with high speed stirring. It is important to make sure that the resin already added is wet thoroughly before more resin is added, and the mix should be stirred until free of all lumps.

A hollow metal mold, the cavity of which has the shape of the desired footwear such for example as that disclosed in the copending application of Hugger, Serial No. 369,429, filed July 21, 1953, now Patent No. 2,725,-647, is then filled to the height desired in the reinforcing walls 13 with the above mixture. The mold containing this material is then passed through a heating oven at about 200° F. for about 8 minutes. Thereafter, more of the above mixture is poured into the mold 10 to completely fill the mold, and after about 4 seconds the mixture is poured out of the mold. The mold at this stage is at a temperature of about 175° F. as a result of the pass through the heating oven above described. The resin mix that adheres to the hot walls of the mold forms the outer wall and the reinforcing wall of the plastic article of footwear. These deposited coats are then gelled in place by putting the mold in a heater at about 420° F. for about 1½ minutes to form a weak cheesy slightly tacky solid. A longer heat treatment will fuse the resin to a tough dry film and prevent adhesion of the subsequently applied heat insulating coat.

The formulation for the heat insulating layer 17 may be as follows:

| Ingredient: | Parts by weight |
|---|---|
| "Plastisol grade" polyvinyl chloride (Geon #121 or QYNV, mfd. by B. F. Goodrich and carbide and carbon respectively) | 100 |
| Plasticizer: | |
| Dioctyl phthalate | 41 |
| Dioctyl adipate | 15 |
| Polyester resin plasticizer (of the type disclosed in Ind. Eng. Chem. 37, 504 (1945) e.g. "Paraplex G–60") | 14 |
| Stabilizer (organic cadmium compound) | 3 |
| Polyoxyethylene esters (Tween 85) Atlas Powder Company | 2 |
| "Unicel N.D." (40% dinitrosopentamethylene tetramine and 60% inert material) | 5 |
| Color pigment | 1 |

The "Tween 85" and "Unicel N.D.," a wetting agent and blowing agent respectively, are added to the mixture of the plasticizer, stabilizer and pigment before the resin is added.

This mixture which is to form the inner thermally insulating lining 17 of the footwear is poured into the hot mold so that it will deposit a skin on the previously formed gelled walls; it is then promptly emptied from the mold. The mold is then placed in an oven which is at a temperature of 420° F. for about 6 minutes to blow the inner coating to form a cellular lining and to fuse the inner and outer walls and bond them together. Since it may be desirable to color the lining differently from the outer wall, the pigments may be different for these two walls.

The viscosity of the formulation at the time of pouring the thermally insulating coating and the outer coatings is important, in order to produce slush molded inner and outer walls of the desired thickness which will accurately reproduce the contour of the metal walls in reverse. As is well known to those skilled in the art, the viscosity of plastisols can be controlled by proper choice and proportion of plasticizers and resins, as well as by the addition of wetting agents. A viscosity of about 8,000 centipoises at 80° F. is preferred for the outer layers 11, 14 and a viscosity of about 2500 centipoises is preferred for the cellular layer 17. The lower viscosity permits the compound to blow more readily. Other gas evolving chemicals can be used in place of the Unicel N.D., e.g., Celogen (p,p'-oxybis(benzenesulfonylhydrazide)), Porofor N (azoisobutyric dinitrile), Unicel (diazoaminobenzene), and sodium bicarbonate.

Footwear formed in accordance with this invention will have a tough relatively thick sole area where the skin 11 is deposited. Consequently such footwear should have a longer useful life than footwear heretofore made, and in particular the wearing life of the sole which is subjected to the greatest wear should more nearly approach the wearing life of the upper which is subjected to relatively little wear.

Having thus described my invention, what I claim and desire to protect by Letters Patent is:

1. The method of making a seamless reinforced footwear having a resinous wall reinforced in the sole and foxing areas, which comprises providing a hollow metal mold having sole and sidewall portions defining a mold cavity, said sidewall portions including a foxing area adjacent the sole portion of the mold, pouring a resinous plastisol into the mold to a depth sufficient only to extend up the sidewalls of said mold a little distance from said sole area and less than the height desired in the completed footwear to form a reinforcing layer for the sole and foxing areas, heating the portion of this plastisol that is adjacent the walls of the mold to form from only a portion of the plastisol a non-cellular skin on the sole and sidewall portions of the mold, pouring additional resinous plastisol into the mold and to a height sufficient for the completed footwear, heating the portion of the plastisol that is adjacent the previously formed skin and is adjacent the sidewalls of the mold to form a non-cellular skin on the remaining walls of the mold and within the reinforcing skin, pouring out the plastisol that does not adhere as a skin to the walls of the mold and to said reinforcing skin, and then heating the plastisol remaining in the mold in the form of a skin sufficiently to fuse said plastisol.

2. The method in accordance with claim 1 of making a seamless reinforced footwear having a resinous outer wall and an integral resinous thermally insulating cellular lining which includes the step of pouring into the mold a plastisol containing a blowing agent to a height sufficient to line the footwear after the first removal of the plastisol from the mold, heating the portion of the plastisol containing a blowing agent that is adjacent the previously cast skin to form a skin thereof that adheres to the previously cast skin, pouring out the excess plastisol containing the blowing agent, and then heating the mold sufficiently to blow the plastisol layer containing the blowing agent and form an impervious cellular lining, and to fuse the resin in the several skins and bond them together.

References Cited in the file of this patent

UNITED STATES PATENTS

| | | |
|---|---|---|
| 1,924,716 | Ferrettie | Aug. 29, 1933 |
| 2,142,981 | Richards | Jan. 3, 1939 |
| 2,144,388 | Quasebarth | Jan. 17, 1939 |
| 2,147,770 | Ford | Feb. 21, 1939 |
| 2,349,549 | Hardman et al. | May 23, 1944 |
| 2,588,571 | Porter | Mar. 11, 1952 |
| 2,629,134 | Molitor | Feb. 24, 1953 |
| 2,652,592 | Williams | Sept. 22, 1953 |

FOREIGN PATENTS

| | | |
|---|---|---|
| 523,547 | Belgium | Oct. 13, 1953 |